March 14, 1939.  O. HUTCHINS ET AL  2,150,167
CURRENT CONTROL AND DISCHARGE OF TRANSIENT OVERVOLTAGES
Filed Sept. 23, 1935
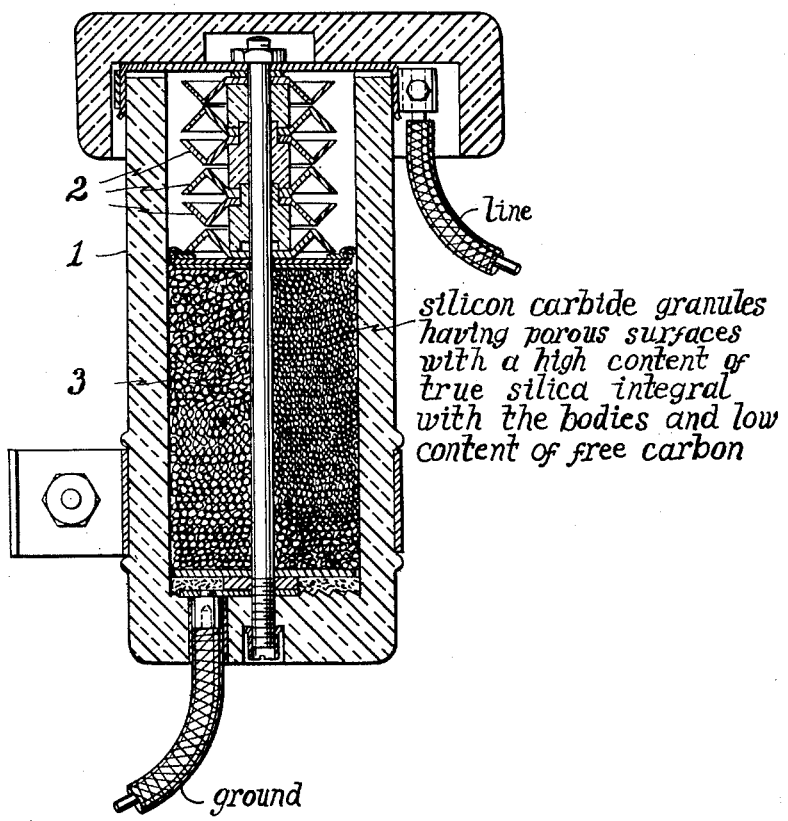
INVENTOR.
Otis Hutchins and John Robert McFarlin
BY
ATTORNEY.

UNITED STATES PATENT OFFICE 2,150,167

CURRENT CONTROL AND DISCHARGE OF TRANSIENT OVERVOLTAGES

Otis Hutchins, Niagara Falls, N. Y., and John Robert McFarlin, Philadelphia, Pa., assignors, by direct and mesne assignments, to Electric Service Supplies Company, Philadelphia, Pa., a corporation of Pennsylvania Application September 23, 1935, Serial No. 41,834

17 Claims. (Cl. 175—30)

Our invention relates to improvements in methods and devices for discharging or equalizing excessive electrical potentials for protective purposes and for controlling the flow of electricity, which utilize a "characteristic element" or material having a rapid decrease in resistance when subjected to increasing voltages, and providing what is commonly known as a valve action.

Our improvements are applicable to a wide variety of apparatus used in connection with the production, transmission and use of electricity and particularly in connection with lightning arresters, high potential dischargers, voltage equalizers, surge absorbers, resistors, rectifiers, oscillation damping elements, current isolators, voltage subdividers, voltage reducers and electro-thermal elements.

We have discovered that the variations in the resistivity of masses of crystalline valve action granules with variations in voltage is accelerated by the presence of oxides, and particularly of silica, on the surfaces of the granules particularly when such masses are used in conjunction with spark gaps; that "dynamic failure voltage" may be increased by the use of such granules in discharge paths provided for discharging and equalizing high electrical potentials; and that the "impedance voltage drop" in such paths may be greatly decreased for high potential currents if such surface oxide or silica is in the form of a porous surface bloom or coating.

Our invention involves the control of the flow of electric current by providing therefor a path containing such granules having oxidized surfaces and consisting preferably of crystalline silicon carbide having an integral surface bloom or coating of oxide, principally true silica, with a low content of carbon. The bloom or coating generally contains small amounts of oxides, such as iron oxide or alumina, and in the preferred form gives to the surface of the silicon carbide a mat, porous, powdery or amorphous appearance and a dull, dark color, and which under the microscope somewhat resembles the surface of coke.

This bloom or coating of silica is formed integrally on the crystalline surfaces by the oxidation thereof, preferably by roasting and tumbling the silicon carbide in the presence of an oxidation accelerator, such as iron oxide, lead oxide or nickel oxide, under oxidizing conditions, as set forth in the application of Otis Hutchins executed concurrently herewith, Serial No. 41,833, wherein it is set forth, inter alia, that silicon carbide as taken from the furnace is crushed so as to separate the agglomerated masses into discrete grains or granules. The discrete grains or silicon carbide crystals are then intimately mixed with an oxidation accelerator, preferably .3% to .8% by weight of ferric oxide of a high degree of purity. Should the granules contain iron oxide as an impurity, the quantity of accelerating agent may be reduced proportionately. The intimate mixture of the silicon carbide granules and oxidation accelerator, and the adhesion of the accelerator to the surfaces of the silicon carbide granules, may be effected by mixing the grains and accelerating agent, together with a little water in a concrete mixer for from fifteen to thirty minutes when a sharp grain is desired. When a mulled grain is desired the grains and accelerator may be rotated together in a slowly revolving ball mill or tube mill for about thirty minutes, or the grain and accelerator may be mixed in a pan mill for about thirty to sixty minutes or until the edges are sufficiently dulled. The thoroughly mixed grain and accelerating agent are then roasted in a rotary kiln under oxidizing conditions. We have found that the amount of oxidation accelerator required to be mixed with the silicon carbide varies somewhat according to the amount of oxidation desired; to the length of time the mixture is subjected to the roasting treatment; and to the amount of accelerator that may be present in or on the silicon carbide as an impurity. In order to produce a final product having a silica content of 1.5% or more, when the roasting is carried on at a temperature of from 1100° C. to 1300° C. for about thirty minutes there should be present with the silicon carbide granules a total of .3% to .8% of ferric oxide, including that present as an impurity on the granules.

The rotation of the kiln tumbles the granules and keeps them in constant agitation thereby facilitating the uniformity of the oxidation of the silicon carbide crystals at the surfaces of the granules and by the agitation during the roasting treatment, there is obtained a type of silicon carbide not hitherto obtained. The ordinary smooth, glassy and iridescent surfaces of the silicon carbide granules become pitted or etched to form a layer containing a high percentage of true silica, which is an integral part of the granules. When roasted under the conditions outlined, the oxidized portions of the surfaces are dull, porous and non-iridescent and the entire surfaces are low in carbon. If roasting of the granules is carried on with an excess of oxidation accelerator or at a higher temperature, a surface coating higher in true silica and low in carbon may be obtained, but parts of such surface may be iridescent and show an appearance of slagging.

In its preferred form, the oxidized surface of the silicon carbide has little or no light reflecting or refracting capacity, and lacks the iridescent, vitreous or glassy characteristics of silicon carbide crystals.

The silicon carbide is preferably oxidized in the form of discrete or non-agglomerated crystals, and may be used in such form in accordance with our invention as discrete grains or granules closely compacted under pressure in a container, or the grains may be bonded together to form blocks, rods, or other shapes by suitable binders, such as ceramics, organic binders or the like, and a greatly improved bond is effected by the use of oxidized silicon carbide granules having porous surfaces, particularly when such granules are bonded under heavy pressure with a minimum amount of binder.

The primary advantages of our invention result, however, from the great improvement in electrical characteristics of devices embodying silicon carbide granules having oxidized surfaces, as compared with the silicon carbide granules which are substantially or commercially pure. The improved electrical characteristics imparted to the oxidized silicon carbide grains vary with the amount of true silica and free carbon on the surface thereof and the porosity of the surface. We prefer such true silica content and porosity of surface as will provide a mass of crystals having a dynamic failure voltage at least 15% higher and an impedance voltage drop at least 20% lower than those of a similar mass of commercially pure silicon carbide crystals of similar grit rating.

The changed and improved electrical characteristics of crystalline granules having silicon carbide cores and oxidized surfaces are evidenced by their higher impedance to dynamic currents; by the increase in their "dynamic failure voltage", or the voltage required to maintain a continuous flow of dynamic current through a column of granules, generally in series with one or more arc gaps, after an initial flow of dynamic current has been initiated by means of an impulse or surge current passed through the granules while the dynamic voltage is connected therewith.

When a silica coating in the form of a powdery or porous appearing bloom is present on silicon carbide granules in "characteristic elements" of discharge or equalizing devices, there is a marked decrease in the "impedance voltage drop", or the voltage which builds up across a column of granules due to the flow of impulse or surge currents therethrough, thereby greatly increasing the effectiveness of the protection afforded by such devices. This notable impedance voltage drop seemingly results from a disturbance by the porous silica layer of the electrostatic fields between the adjacent granules.

In devices for discharging or equalizing excessive electrical potentials for protective purposes, it is important that the impedance voltage drop be as low as possible and not in excess of certain predetermined maximum values, and that the dynamic failure voltage be as high as possible and in excess of certain predetermined minimum values under given conditions of test appropriate to the particular installation. For such protective uses, there may be advantageously used, for example, silicon carbide crystals having their surfaces oxidized to a dull, mat, powdery, porous appearance and having chemical constituents, other than true silicon carbide, of the order of—

| | Per cent |
|---|---|
| Total surface silica and silicon | 2.20 |
| Surface silicon | .30 |
| True or surface silica | 1.50 to 1.90 |
| Free carbon | .02 |
| Iron | .20 |
| Aluminum | .15 |

Excellent results are obtainable with grain having a true silica content of 1.7% to 1.9%, and with the surface silicon, iron, aluminum and free carbon kept as low as possible. The discharge or flow of electric currents may, however, be advantageously controlled or regulated by providing a conducting path containing silicon carbide granules having a surface coating of true silica as low as .5% and up to 3% or higher, and with a free carbon content up to .05% if the true silica content is correspondingly high.

Characteristic elements for lightning arresters embodying our present invention possess very high resistance to low values of voltage impressed across the terminals but are relatively good conductors at high values of voltage impressed across the terminals, and consequently permit currents of abnormal voltage to flow with relatively little impedance but offer very high resistance to current tending to flow by reason of normal system voltage impressed across the terminals of the characteristic elements.

The accompanying drawing is a longitudinal sectional view illustrating the embodiment of our invention in a lightning arrester such as shown in the McFarlin Patent No. 1,763,667.

In the embodiment of our invention illustrated in the drawing, the housing 1 contains spaced electrodes 2 forming spark gaps in series with a discrete mass 3 of silicon carbide granules having surfaces oxidized in accordance with our present invention; the spark gaps being proportioned relatively to the normal voltage of the circuit for which the arrester is designed, and the length of the crystalline path and the size of the granules being proportioned to produce an arc suppressive or interrupting effect proportioned to the normal system voltage.

By the utilization of our improvements in such an arrester, a minimum quantity of granules may be employed to secure the desired arc suppressive effect, and such granules impose minimum permissive impedance to surge currents combined with the desired impedance to dynamic current and arc suppressive effect. The granules have a high degree of permanence under normal operating conditions and hold to their original characteristics, so that the efficiency of the arrester is unaffected over long periods of time, and the granules exhibit to a very marked degree the inverse change in resistance due to variations in voltage impressed across them. By our improvements, the performance of lightning arresters of like construction are rendered much more uniform and there is avoided the wide variations in the performance of lightning arresters heretofore made embodying characteristic elements, and the causes of which have been unascertained.

By providing and controlling the chemical and physical characteristics of silicon carbide granules as herein set forth, we not only provide arresters having much more desirable characteristics than are possible with silicon carbide grains that are clear and bright and have sharp edges, but we are enabled to construct lightning arresters in quantity whose operating characteristics lie within very close limits.

Our studies have indicated that where the content of surface silicon approximates or is greater than the content of true silica on the surface, it has a deleterious effect on the arc suppressing capacity of the arrester. In silicon carbide granules where the percentage of silica is in excess of the silicon, and particularly where it is greatly in excess, slight variations in surface silicon seem to have relatively little effect on the characteristics of the grain for lightning arrester use, but it appears probable that if the surface silicon could be practically eliminated, such elimination would measurably better the granules for lightning arrester use, but it has so far been found impossible to eliminate the surface silicon and at the same time secure the desired high percentage of surface silica.

The presence of free carbon on the silicon carbide granules has been found to lower the impedance to the passage of surge currents but likewise lowers the impedance to dynamic current and lowers the arc suppressive effect of the granules, thereby necessitating the use of longer column lengths of granules to secure proper lightning arrester operation on circuits having a given voltage rating. It is therefore deemed preferable to hold to a minimum or eliminate free carbon from the granules used in practicing our invention.

The amount of true surface silica on silicon-carbide granules very definitely affects the performance of such granules as characteristic elements of lightning arresters and other current discharging, voltage, equalizing and control apparatus.

The most striking characteristic of silicon carbide granules for such use involved in our invention is their high percentage of true silica and the extensive pitting or oxidation of the surfaces and edges, though some surface areas may not be completely pitted and have some slight light reflecting power. The edges and corners of the grains are not clean and sharp as are those of ordinary silicon carbide granules and are generally more rounded off.

The effect of the use of silicon carbide granules having surfaces oxidized as herein described in comparison with the use of standard silicon carbide granules heretofore available and heretofore deemed best for use in connection with lightning arresters is illustrated by the following typical results of comparative tests of groups of commercial lightning arresters of the type shown in the McFarlin Patent No. 1,763,667; one group containing as their characterisic elements standard silicon carbide granules of 36 grit size and the other group containing as their characteristic elements oxidized silicon carbide granules having analyses and characteristics of the order of the example of preferred oxidized grain hereinbefore given, and also of 36 grit size:

| | | | | |
|---|---|---|---|---|
| 1. Kilovolt rating of arrester | 6 | 9 | 12 | 15 |
| 2. Suitable for use on circuits having nominal circuit voltages of | 4,600 | 6,900 | 11,200 | 13,200 |
| 3. Length of discharge path through characteristic element: | | | | |
| a. of standard silicon carbide | 10″ | 14″ | 17″ | 20″ |
| b. of oxidized silicon carbide | 8″ | 10½″ | 14″ | 17″ |
| 4. Percent of decrease in length of discharge path by use of oxidized silicon carbide grains | 20% | 25% | 18% | 15% |
| 5. Impedance voltage drop due to 1000 ampere surge across characteristic element: | | | | |
| a. of standard silicon carbide grains | 39 k. v. | 54 k. v. | 67 k. v. | 85 k. v. |
| b. of oxidized silicon carbide grains | 22.5 k. v. | 28 k. v. | 37 k. v. | 50 k. v. |
| 6. Percent of decrease in impedance voltage drop due to use of oxidized silicon carbide granules | 42% | 48% | 44% | 41% |
| 7. Dynamic failure voltage with characteristic element of: | | | | |
| a. standard silicon carbide grains | 8.5 k. v. | 12 k. v. | 15 k. v. | 18 k. v. |
| b. oxidized silicon carbide grains | 9 k. v. | 12.5 k. v. | 16.5 k. v. | 20.5 k. v. |

From the foregoing it will be seen that superior results are obtainable with arresters containing the oxidized granules than with standard granules even though considerably smaller masses of oxidized granules are used.

By comparison of masses of standard granules with masses of oxidized granules of the same length, the following results were obtained:

| | | | | |
|---|---|---|---|---|
| 8. Length of masses of silicon carbide granules | 10″ | 14″ | 17″ | 20″ |
| 9. Impedance voltage due to 1000 ampere surge across elements: | | | | |
| a. of standard silicon carbide grains | 39 k. v. | 54 k. v. | 67 k. v. | 85 k. v. |
| b. of oxidized silicon carbide grains | 28 k. v. | 37 k. v. | 45 k. v. | 59 k. v. |
| 10. Percentage decrease in impedance by use of oxidized silicon carbide grains | 28% | 30% | 31% | 30% |
| 11. Dynamic failure voltage using: | | | | |
| a. standard silicon carbide grains | 8.5 k. v. | 12 k. v. | 15 k. v. | 18 k. v. |
| b. oxidized silicon carbide grains | 12 k. v. | 16.5 k. v. | 20.5 k. v. | 23 k. v. |
| 12. Percent increase in dynamic failure voltage by use of silicon carbide grains | 41% | 37% | 37% | 28% |

As compared with lightning arresters employing previously available forms of silicon carbide as the characteristic element, we are enabled by our discoveries to produce lightning arresters having lower impedance values to surge current flows; retaining at the same time equal or higher arc-supressive values. We are enabled to produce lightning arresters of efficiency equal to or higher than existing types in sizes considerably smaller; and we are enabled to produce lightning arresters which suffer no measurable deterioration in service and which consequently have long useful lives.

These novel results accrue from the use of a body of granules having crystalline carbide cores and surfaces composed of disintegrated portions of the crystalline structure from which portions have been eliminated. The decomposition of portions of the crystalline structure into silica and carbon and the elimination of a portion of the liberated carbon results in the formation of a non-vitreous surface in which a portion of the normal carbon content present in the core is absent and such dull porous surfaces preferably have a true silica content of the order of 1.75% and a free carbon content not exceeding .05%.

Having described our invention, we claim:

1. A device for controlling the flow of electric current including a current-carrying mass of crystalline granules having porous oxidized surfaces containing silica integral with the crystalline portions of the granules, said surfaces being free from at least a portion of the carbon normally present in silicon carbide.

2. A device for controlling the flow of electric current including a current-carrying mass of silicon carbide granules having porous surface coatings composed principally of silica integral with the granules and free from at least a portion of the carbon normally present in silicon carbide.

3. A device for discharging or equalizing excessive electrical potentials for protective purposes comprising a discharge path containing granules having a silicon carbide body and having a mat micro-porous surface containing silica integral with the body, said surface being free from at least a portion of the carbon normally present in silicon carbide.

4. A device for discharging or equalizing excessive electrical potentials for protective purposes comprising a body of granules having silicon carbide bodies and having porous surfaces containing silica integral with the bodies and devoid of free carbon in excess of .05%.

5. A device for controlling the flow of electric current comprising a body of grains having silicon carbide bodies and having dull dark porous surfaces with a high content of true silica integral with the bodies and a low content of free carbon.

6. A device for controlling the flow of electric current comprising a body of grains having crystalline silicon carbide bodies and having porous surfaces composed of disintegrated portions of the crystalline structure consisting of residual silica integral with the bodies and devoid of at least a portion of the carbon normally present in silicon carbide.

7. A device for controlling the flow of electric current comprising a body of granules having crystalline silicon carbide bodies and surfaces composed of disintegrated portions of the crystalline structure and consisting primarily of silica free from a portion of the carbon normally present in silicon carbide surfaces.

8. A device for discharging or equalizing excessive electrical potentials for protective purposes comprising a body of grains having crystalline silicon carbide bodies and matte surfaces comprising porous silica blooms, and with a portion of the normal carbon content of the body eliminated from its surface layer.

9. A device for controlling the flow of current comprising a body of grains having crystalline silicon carbide bodies and having surfaces resulting from the decomposition of portions of the crystalline structure into silica and carbon and the elimination of a portion of the liberated carbon.

10. A device for discharging or equalizing excessive electrical potentials for protective purposes comprising a body of grains having silicon carbide bodies and dull, dark and non-iridescent porous surface layers and having a true silica content integral with the bodies of at least one-half of one per cent and devoid of free carbon in excess of .05%.

11. A device for discharging or equalizing excessive electrical potentials for protective purposes comprising a body of grains having crystalline silicon carbide bodies and dull, porous surfaces and having a true silica content integral with the bodies of the order of 1.75% and a free carbon content not exceeding .05%.

12. A device for controlling the flow of electric current comprising a body of non-agglomerated granules consisting essentially of silicon carbide, such granules having surfaces over-laid with porous silica integral with the remainder of the granules, the content of silica being at least 1% and the content of free carbon not exceeding .05%.

13. A device for discharging or equalizing excessive electrical potentials for protective purposes comprising a mass of silicon carbide bodies bonded together by a binder and characterized by porous silica surface layers on and integral with such bodies, said surface layers being devoid of at least a portion of the carbon normally present in silicon carbide.

14. A device for discharging or equalizing excessive electrical potentials for protective purposes comprising a mass of silicon carbide bodies bonded together by a ceramic binder and characterized by porous silica surface layers on and integral with such bodies and coacting with the binder, said layers being devoid of free carbon in excess of .05%.

15. A device for discharging or equalizing excessive electrical potentials for protective purposes comprising a mass of silicon carbide bodies bonded together by an organic binder and characterized by porous silica surface layers on and integral with the bodies and from which at least a portion of the carbon has been eliminated.

16. A device for controlling electric flow including a mass of granules composed of crystalline silicon carbide bodies having a resistivity inverse to applied voltages and surface walls of true silica integral with the silicon carbide and devoid of at least a portion of the carbon normally present in silicon carbide, the integral walls of the respective granules forming minute pores and preventing contact between the silicon carbide bodies, said mass having a dynamic failure voltage at least 15% higher than the dynamic failure voltage of a similar body of silicon carbide granules of similar size having contacting surfaces of silicon carbide and having an impedance voltage drop at least 20% lower than the impedance voltage drop of a similar body of silicon carbide granules of similar size having contacting surfaces of silicon carbide.

17. A device for controlling electric flow including a mass of contacting granules composed of crystalline silicon carbide bodies having a resistivity inverse to applied voltages and surface walls forming minute pores and having a true silica content of the order of 1.75% by weight of the granules and devoid of free carbon in excess of .05%.

OTIS HUTCHINS.
JOHN ROBERT McFARLIN.

DISCLAIMER 2,150,167.—*Otis Hutchins*, Niagara Falls, N. Y., and *John Robert McFarlin*, Philadelphia, Pa. CURRENT CONTROL AND DISCHARGE OF TRANSIENT OVERVOLTAGES. Patent dated March 14, 1939. Disclaimer filed July 30, 1941, by the assignee, *Electric Service Supplies Company*.

Hereby enters this disclaimer to claims 7 and 9 of said Letters Patent.

[*Official Gazette September 2, 1941.*]